US008051874B2

(12) United States Patent
McCarty (10) Patent No.: US 8,051,874 B2
(45) Date of Patent: Nov. 8, 2011

(54) REPLACEABLE OUTLET LINER FOR CONTROL VALVE

(75) Inventor: Michael W. McCarty, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 818 days.

(21) Appl. No.: 11/531,443

(22) Filed: Sep. 13, 2006

(65) Prior Publication Data

US 2008/0060704 A1 Mar. 13, 2008

(51) Int. Cl.
*F16L 7/00* (2006.01)

(52) U.S. Cl. .......................................... 137/375; 251/360

(58) Field of Classification Search ................... 137/375, 137/283, 284; 251/363, 361, 360, 124; 138/40
See application file for complete search history.

(56) References Cited

U.S. PATENT DOCUMENTS

| | | | | |
|---|---|---|---|---|
| 1,349,594 | A | * | 8/1920 | Wafer et al. ................... 137/242 |
| 2,301,355 | A | * | 11/1942 | Armentrout .................... 138/45 |
| 2,598,187 | A | * | 5/1952 | Meyer .......................... 251/126 |
| 3,122,160 | A | * | 2/1964 | Carr et al. .................. 137/484.2 |
| 3,942,553 | A | * | 3/1976 | Gallatin .................... 137/599.07 |
| 4,444,220 | A | | 4/1984 | Seger |
| 4,446,883 | A | * | 5/1984 | Paul, Jr. ................... 137/315.18 |
| 4,506,860 | A | * | 3/1985 | von Schwerdtner et al. . 251/124 |
| 4,735,229 | A | * | 4/1988 | Lancaster ..................... 137/375 |
| 4,892,289 | A | * | 1/1990 | Van Dyk Burckard et al. ........................ 251/368 |
| 5,201,491 | A | * | 4/1993 | Domangue .................... 251/122 |
| 5,873,351 | A | * | 2/1999 | Vars et al. ...................... 123/527 |
| 6,666,433 | B1 | * | 12/2003 | Pierce .......................... 251/359 |
| 7,004,448 | B2 | * | 2/2006 | Suter et al. .................... 251/122 |
| 7,137,612 | B2 | * | 11/2006 | Baca ............................ 251/122 |

FOREIGN PATENT DOCUMENTS

| | | |
|---|---|---|
| EP | 0 085 251 | 8/1983 |
| EP | 0 124 230 | 11/1984 |
| EP | 0 520 567 A1 | 12/1992 |
| WO | WO 00/46532 | 8/2000 |

OTHER PUBLICATIONS

International Search Report for PCT/US2007/077650, mailed Dec. 10, 2007.
Written Opinion of the International Searching Authority for PCT/US2007/077650, mailed Dec. 10, 2007.
English Translation of Russian Office Action issued on Apr. 22, 2010.
English translation of Chinese Office Action issued on Aug. 31, 2010.

* cited by examiner

*Primary Examiner* — Kevin Lee
*Assistant Examiner* — Macade Brown
(74) *Attorney, Agent, or Firm* — Marshall, Gerstein & Borun LLP (57) ABSTRACT

A liner assembly adapted to line a valve body of a control valve comprises a sleeve, a liner and a retainer. The sleeve has an inner surface and an outer surface. The inner surface defines a bore. The outer surface is adapted to be disposed in engagement with the outlet of the control valve. The liner is slidably disposed within the bore of the sleeve. The retainer is in engagement with the liner to removably secure the liner within the sleeve.

34 Claims, 3 Drawing Sheets

REPLACEABLE OUTLET LINER FOR CONTROL VALVE

FIELD OF THE DISCLOSURE

The present disclosure generally relates to a liner for an outlet of a control valve and, more particularly, to a replaceable liner for an outlet of a control valve,

BACKGROUND

Typical fluid process control systems comprise various components for controlling various process parameters. For example, a fluid process control system may include a plurality of valves for controlling volumetric flow rate, temperature, and/or pressure of a medium flowing through the system. The end product is often dependent on the accuracy of the control of these parameters, which is, in turn, dependent on the geometry and characteristics of the control valves. For example, control valves are specifically designed and selected to provide for particular flow capacities and pressure changes. If and when these characteristics are compromised, the quality of the end product may be affected.

In many process control systems, the character of the control valves may be compromised by the particular media flowing through the system. For example, the media may include a fluid contaminated with or inherently containing particulate matter that can impact the internal surfaces of the control valve. After prolonged use, the particulate matter can begin to erode the control valve. Additionally, as mentioned above, control valves are often implemented to generate a pressure change in the process media. In many circumstances, the control valves are designed to generate pressure drops below the vapor pressure of the media, thereby rapidly increasing the velocity and volume of the media due to a phase change of the process media. Such rapid increases are often referred to as flashing, which can damage the control valve. Flashing is another example of a potentially erosive situation. Further yet, another problem with fluid process control systems includes the potential for crystallization of the media due to changes in pressure and temperature. Further still, in various fluid process control systems, the media may include components that may electrically or chemically react with the control valve to cause corrosion. Thus, it is well-known that erosion and/or corrosion can affect the useful life of any given fluid process control system component.

To counteract the detrimental effects of erosion and/or corrosion it is generally known to provide a sacrificial element within at least a portion of the interior of the control valve. This sacrificial element, such as a liner made from Stellite® available from Deloro Stellite Company Inc. of Goshen, Ind. or a ceramic liner, therefore takes the brunt of any impact of particulate matter, as well as the effects of flashing. For example, a typical control valve includes a valve body defining an inlet, an outlet, and a flow path disposed between the inlet and outlet. Often, the control valve receives a high pressure, low velocity medium at the inlet. Upon passing through the control valve to the outlet, however, the state of the medium changes to low pressure, high velocity and, in some circumstances, from a liquid to a gas, as mentioned above. Therefore, debris or particulate matter in the medium tends to have more of a detrimental impact on the outlet of the valve body because of the higher velocity and lower pressure. Thus, protective sacrificial liners are oftentimes provided to line the outlet portion of the valve body.

Typical sacrificial liners comprise thin walls secured to the inner surface of the outlet of the valve body. In one conventional manufacturing process, the sacrificial liner is first heat shrunk into an inner sleeve. The sleeve and liner assembly is then secured into the outlet of the valve body. In another conventional manufacturing process, the sacrificial liner is first press-fit into an inner sleeve prior to securing the assembly into the outlet of the valve body. In either of these manufacturing processes, the liner and the sleeve must be prefabricated within relatively small tolerances. Once assembled, the sleeve and liner assembly is generally removable from the valve body; however the heat shrunk or press-fit liner is essentially permanently attached to the sleeve to such extent that it is un-repairable and non-replaceable. Thus, when the liner erodes, corrodes, or otherwise becomes damaged, the entire sleeve and liner assembly must be replaced.

SUMMARY

According to one aspect of the present disclosure, a liner assembly is provided which is adapted to line an outlet of a control valve. The liner assembly comprises a sleeve, a liner, and a retainer. The sleeve has an inner surface and an outer surface. The inner surface is generally cylindrical and defines a bore. The outer surface is adapted to be disposed in engagement with the outlet of the control valve. The liner is slidably disposed within the bore of the sleeve. The retainer engages the liner to removably secure the liner within the sleeve.

According to another aspect, the sleeve further comprises an engagement surface. The engagement surface extends inward of the inner surface of the sleeve in a radial direction of the sleeve and is engaged by the liner.

According; to another aspect, the retainer comprises a retention ring. The retention ring engages an upstream end portion of the sleeve and an upstream end portion of the liner.

According to another aspect, the sleeve comprises a first shoulder and the liner comprises a second shoulder. The second shoulder is in engagement with the first shoulder in an axial direction of the sleeve.

According to another aspect, the first shoulder is disposed between opposing upstream and downstream end portions of the sleeve and the second shoulder is disposed between opposing upstream and downstream end portions of the liner.

According to an alternative aspect, the first shoulder is disposed adjacent a downstream end portion of the sleeve and the second shoulder is disposed adjacent a downstream end portion of the liner.

According to another aspect, the liner comprises a ceramic liner.

According to still another aspect, the liner comprises a plurality of liner components.

According to still another aspect, the plurality of liner components are stacked in an axial direction of the sleeve.

A further aspect of the present disclosure provides a control valve comprising a valve body, a control element, a sleeve, a liner, and a retainer. The valve body comprises an inlet, an outlet, and a flow path disposed between the inlet and the outlet. The control element is disposed within the valve body and is adapted to control the flow of a fluid through the now path. The sleeve comprises an inner surface and an outer surface. The outer surface of the sleeve is in fixed engagement with the outlet of the valve body. The liner comprises an outer surface in engagement with the inner surface of the sleeve. The retainer is in engagement with the liner to removably secure the liner within the sleeve, A still further aspect of the present disclosure provides a method of removably installing a protection device for protecting an outlet portion of a valve body of a control valve. The method comprises inserting a ceramic liner into a sleeve such that a first engagement surface carried by an inner surface of the sleeve is engaged by a second engagement surface carried by an outer surface of the liner. Additionally, the method comprises removably securing a retention ring to a portion of the sleeve such that the retention ring engages the liner. Further, the method comprises inserting the sleeve containing the liner into the outlet portion of the valve body.

DETAILED DESCRIPTION

Figure 1:
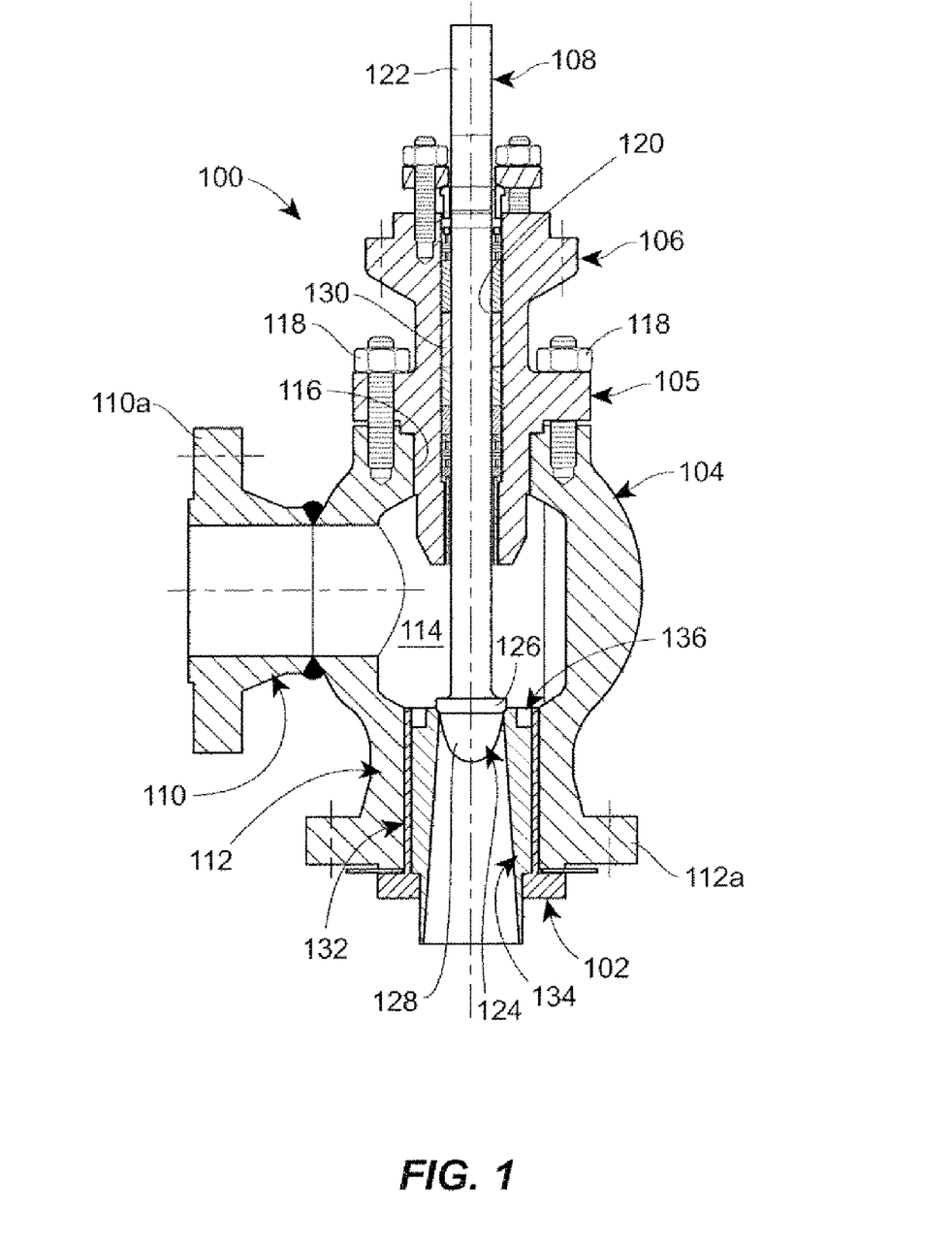
FIG. 1 is a cross-sectional side view of a control valve comprising one embodiment of a liner assembly and constructed in accordance with the principles of the present disclosure.

FIG. 1 depicts a control valve 100 comprising a sleeve assembly 102 and constructed according to the principles of the present disclosure. The control valve 100 depicted in FIG. 1 includes an angle-style valve; however, it should be appreciated from the following description of various examples and embodiments of the present disclosure that the control valve 100 may include a globe valve, a rotary valve, a roto-globe valve, or any other valve type that may serve the principles of the present disclosure.

The control valve 100 depicted in FIG. 1 generally includes a valve body 104 and a control assembly 105. The control assembly 105 comprises a bonnet 106 and a control element 108. The control element 108 is slidably supported by the bonnet 106 to control a flow of fluid through the valve body 104 in cooperation with, for example, a fluid process control system incorporating the control valve 100.

More specifically, the valve body 104 of the control valve 102 comprises an inlet portion 110, an outlet portion 112, a flow path 114, and a control opening 1116. The flow path 114 generally extends between the inlet portion 110 and the outlet portion 112. In the embodiment of the control valve 100 depicted in FIG. 1, which includes an angle-style control valve, the outlet portion 112 is disposed at an angle of approximately 90 degrees relative to the inlet portion 110. Additionally, each of the inlet and outlet portions 110, 112 includes a flange 110a, 112a, respectively, for coupling the control valve 100 between additional components of a fluid process control system.

As mentioned, the control assembly 105 comprises the bonnet 106 and the control element 108. The control element 108 comprises a stem 122 and a valve plug 124. The valve plug 124 includes an annular crown portion 126 and a lower flow diverter portion 128. The stem 122 comprises a generally cylindrical rod slidably disposed in the bonnet 106. The bonnet 106 is fixed to the valve body 104 adjacent the control opening 116 of the valve body 104 via a plurality of threaded fasteners 118. The bonnet 106 includes an elongated bore 120 slidably receiving the stem 122 of the control element 108.

Additionally, the bore 120 of the bonnet 106 contains a packing material 130 for providing a seal between the bore 120 and the stem 122. Thus, it should be appreciated that the stem 122 of the control element 108 is adapted to be coupled to an actuator to controllably displace the control element 108, and therefore the valve plug 124, within the valve body 104 to control the flow of fluid between the inlet portion 110 and the outlet portion 112.

As mentioned above, the control valve 100 comprises a sleeve assembly 102 disposed adjacent the outlet portion 1112 of the valve body 104. More specifically and with reference to FIG. 2, the outlet portion 112 of the valve body 104 includes a generally cylindrical inner surface 112b. The sleeve assembly 102 is disposed with n the outlet portion 112 generally adjacent the inner surface 112b. The sleeve assembly 102 generally comprises a sleeve 132, a liner 134, and a retainer 136. The sleeve 132 comprises an upstream end portion 132a, a downstream end portion 132b, a body portion 138, a flange portion 140, and a shoulder portion 141. The body portion 138 comprises a generally hollow cylinder including an outer surface 142 and an inner surface 144. The outer surface 142 of the body portion 138 of the sleeve 132 engages the inner surface 112b of the outlet portion 112 of the valve body 104. In one embodiment, a dimension of the outer surface 144 of the sleeve 132 is slightly smaller than a dimension of the inner surface 112b of the outlet portion 112, thereby enabling the sleeve 132 to be slid into and out of the outlet portion 112 during installation or removal, as will be described in more detail below.

Figure 2:
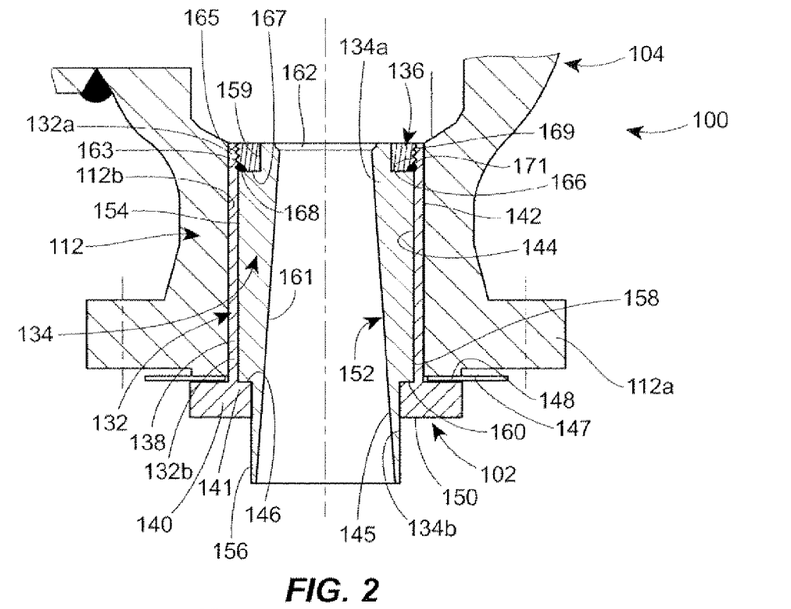
FIG. 2 is a partial cross-sectional side view of the control valve of FIG. 1 detailing the liner assembly and taken from circle II of FIG. 1.

The shoulder portion 141 is disposed adjacent the downstream end portion 132b of the sleeve 132 and includes a generally cylindrical opening 145 and a liner engagement surface 146. The liner engagement surface 146 extends radially inward of the inner surface 144 of the body portion 138 of the sleeve 132. In the disclosed embodiment, the liner engagement surface 146 extends from the inner surface 144 at an angle of approximately 90 degrees.

The flange portion 140 of the sleeve 132 is also disposed adjacent the downstream end portion 132b of the sleeve 132. The flange portion 140 generally comprises an annular flange extending radially outward of the outer surface 142 of the body portion 138 of the sleeve 132. Accordingly, the flange portion 140 includes an outlet engagement surface 148 and an auxiliary abutment surface 150. The outlet engagement surface 148 is disposed generally parallel to the auxiliary abutment surface 150 and adjacent the flange 112a of the outlet portion 112 of the valve body 104. In the disclosed embodiment, a washer 147 is disposed between the outlet engagement surface 148 and the flange 112a. Additionally, the auxiliary abutment surface 150 is adapted to be engaged by another fluid process control component such as a flange of a length of pipe, an outlet fitting of a tank, or any other such component. Such other component is fixed to the control valve 100 via the flange 112a of the outlet portion 112 of the valve body 104. As is generally understood, the flange 112a is fixed with a plurality of threaded fasteners to a flange of similar construction disposed on another component. This attachment secures the flange portion 140 of the sleeve 132 against the flange 112a of the valve body 104, thereby removably securing the sleeve 132 in the outlet portion 112.

So configured, the sleeve 132 is adapted to mount the liner 134 within the outlet portion 112 of the valve body 104. More specifically, the liner 134 depicted in FIGS. 1 and 2 comprises an upstream end portion 134a, a downstream end portion 134b, an inner surface 152, a first outer surface 154, a second outer surface 156, a shoulder 158) and an annular recess 159. The shoulder 158 is disposed between the first and second outer surfaces 154, 156 along an axial direction of the liner 134. The shoulder 158 includes a sleeve engagement surface 160. The first and second outer surfaces 154, 156 are generally cylindrical. The first outer surface 154 includes a diameter that is slightly larger than a diameter of the second outer surface 156. Accordingly the sleeve engagement surface 160 extends radially between and connects the first and second outer surfaces 154, 156.

As depicted in FIGS. 1 and 2, the first outer surface 154 of the liner 134 is disposed adjacent to and in engagement with the inner surface 144 of the sleeve 132. The sleeve engagement surface 160 of the liner 134 axially engages the liner engagement surface 146 of the sleeve 132. This engagement between the liner engagement surface 160 and the sleeve engagement surface 146 limits displacement of the liner 134 relative to the sleeve 132 in a downward direction relative to the orientation of the control valve 100 depicted in FIGS. 1 and 2. Additionally, a portion of the second outer surface 156 of the liner 134 is disposed adjacent to and in engagement with the opening 145 in the shoulder portion 141 of the sleeve 132. In the disclosed embodiment, the downstream end portion 134b of the liner 134 extends axially beyond the shoulder portion 141, as well as the auxiliary abutment surface 150 of the flange portion 140 of the sleeve 132. So configured, when the outlet portion 112 of the control valve 100 depicted in FIGS. 1 and 2 is coupled to another fluid process control system component such as a tank, for example, the downstream end portion 134b of the liner 134 extends into the tank.

Still referring to FIG. 2, the inner surface 152 of the liner 134 includes a nozzle portion 161 and a valve seat portion 162. The nozzle portion 161 is generally frustoconical and diverges from the upstream end portion 134a of the liner 134 toward the downstream end portion 114b of the liner 134. Similarly, in the disclosed embodiment of the control valve 100, the valve seat portion 162 of the inner surface 152 is generally frustoconical; however, the valve seat portion 162 converges from the upstream end portion 134a of the liner 134 toward the downstream end portion 134b of the liner 134. So configured, the valve seat portion 162 of the inner surface 152 of the liner 114 is adapted to be engaged by the valve plug 1247 as depicted in FIG. 1 and, more particularly, the lower flow diverter portion 128 of the valve plug 124 to close the control valve 100 and prevent the flow of a fluid between the inlet portion 1190 and the outlet portion 112.

As stated above, engagement between the liner engagement surface 146 of the sleeve 132 and the sleeve engagement surface 160 of the liner 134 limits displacement of the liner 134 relative to the sleeve 132 in the downward direction relative to the orientation of the control valve 100 depicted in FIGS. 1 and 2. Additionally, the retainer 136 of the disclosed embodiment limits displacement of the liner 134 relative to the sleeve 132 in an upward direction relative to the orientation of the control valve 100 depicted in FIGS. 1 and 2. More specifically, the retainer 136 comprises an annular retention ring disposed in the recess 159 of the liner 134. The recess 159 includes a substantially flat securement surface 163. The retainer 136 includes a generally cylindrical outer surface 165 and a generally flat securement surface 167. The outer surface 165 includes a plurality of threads 169. Additionally, the inner surface 144 of the sleeve 1302 comprises a plurality of threads 166 disposed on the upstream end portion 132a of the sleeve 132. The plurality of threads 169 on the retainer 136 engage the plurality of threads 166 on the sleeve 132 to removably couple the retainer 136 to the sleeve 132. The securement surface 167 may further include an annular recess 168 to cooperate with a gasket 171, as identified in FIGS. 3-5, or other suitable sealing device generally known in the art, to affect a fluid seal between the sleeve 132 and the liner 34. Additionally, the securement surface 167 of the retainer axially engages the securement surface 163 of the recess 159 to limit displacement of the liner 134 in the upward direction relative to the orientation of the control valve 100 depicted in FIGS. 1 and 2. Therefore, the sleeve 132 and retainer 136 work in cooperation to maintain the axial disposition of the liner 134 within the sleeve 132. Additionally, the retainer 136, as mentioned, is removably coupled to the sleeve 132. So configured, the retainer 136 may be threaded out of engagement with the sleeve 132, thereby enabling the liner 134 to be slidably removed from the sleeve 132 in the upward direction relative to the orientation of the control valve 100 depicted in FIGS. 1 and 2. Therefore, it should be appreciated that the sleeve assembly 102 disclosed in FIGS. 1 and 2 provides a replaceable liner 134 than can be slid into and out of the sleeve 132 during installation and to replace the liner 134 shall it become corroded and/or eroded, or otherwise damaged.

Figure 3:
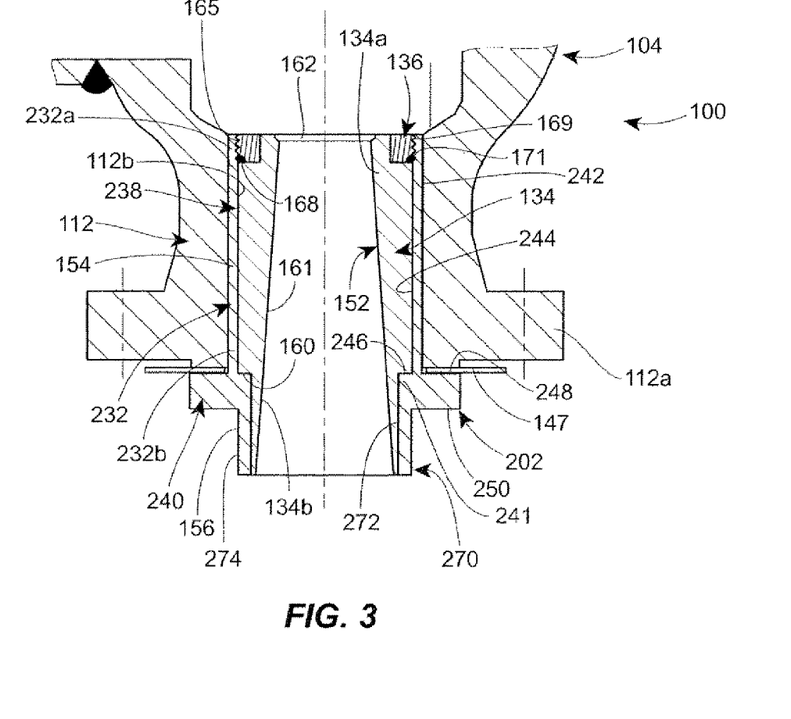
FIG. 3 is a partial cross-sectional side view of the control valve of FIG. 1 comprising an alternative embodiment of a liner assembly and taken from circle II of FIG. 1.

FIG. 3 depicts an alternative sleeve assembly 202 disposed adjacent the outlet portion 112 of the valve body 104 described above with reference to FIG. 1. The sleeve assembly 202 depicted in FIG. 3 is constructed similar to the sleeve assembly 102 described above with reference to FIGS. 1 and 2, and therefore like components will be identified with like reference numerals. Specifically, the sleeve assembly 202 generally comprises a sleeve 232, a liner 134, and a retainer 136. The liner 134 and the retainer 136 of the sleeve assembly 202 depicted in FIG. 3 are identical to the liner 134 and retainer 136 described above with reference to FIGS. 1 and 2, and therefore the specific details of each will not be repeated.

Similar to the sleeve 132 described above with reference to FIGS. 1 and 2, the sleeve 232 depicted in FIG. 3 comprises an upstream end portion 232a, a downstream end portion 232b, a generally cylindrical body portion 238, a flange portion 240, and a shoulder portion 241. Additionally, however, the sleeve 232 includes a rim portion 270. The body portion 238 comprises a generally hollow cylinder including an outer surface 242 and an inner surface 244. The outer surface 242 of the body portion 238 of the sleeve 232 engages the inner surface 112b of the outlet portion 1112 of the valve body 104. In one embodiment, a dimension of the outer surface 244 of the sleeve 232 is slightly smaller than a dimension of the inner surface 112b of the outlet portion 112, thereby enabling the sleeve 232 to be slid into and out of the outlet portion 112.

The flange portion 240 of the sleeve 232 is disposed between the body portion 238 and the rim portion 270 of the sleeve 232. The flange portion 240 generally comprises an annular flange having a radial dimension larger than a radial dimension of the body portion 238. Accordingly, the flange portion 240 includes an outlet engagement surface 248 and an auxiliary abutment surface 250. The outlet engagement surface 248 and auxiliary abutment surface 250 extend radially outward of the outer surface 242 of the body portion 238 of the sleeve 232. In the embodiment depicted, the outlet engagement surface 248 is disposed generally parallel to the auxiliary abutment surface 250 and adjacent the flange 112a of the outlet portion 112 of the valve body 104. In the disclosed embodiment, a washer 147 is also disposed between the outlet engagement surface 248 and the flange 112a. Additionally, the auxiliary abutment surface 250 is adapted to be engaged by another fluid process control component such as a flange of a length of pipe, an outlet fitting of a tank, or any other such component to thereby removably securing the sleeve 232 in the outlet portion 112 of the valve body 104.

The shoulder portion 241 extends radially inward of the inner surface 244 of the body portion 238 of the sleeve 232 and defines a liner engagement surface 246. In the disclosed embodiment, the liner engagement surface 246 extends from the inner surface 244 at an angle of approximately 90 degrees. Additionally, in the embodiment of FIG. 3, the liner engagement surface 246 is disposed in substantial axial alignment with the outlet engagement surface 248 of the flange 112a of the outlet portion 12 of the valve body 104. So configured, the shoulder portion 241 is disposed between the body portion 238 and the rim portion 270.

The rim portion 270 of the sleeve 232 is generally cylindrical and extends from the shoulder portion 241 in a direction opposite of the body portion 238. The rim portion 270 comprises an inner surface 272 and an outer surface 274. The inner surface 272 has a diameter slightly smaller than a diameter of the inner surface 244 of the body portion 238 of the sleeve 232. The shoulder portion 241 and, more particularly, the liner engagement surface 246 of the shoulder portion 241 extends radially between and connects the inner surface 244 of the body portion 238 and the inner surface 272 of the rim portion 270.

The sleeve 232 is adapted to mount the liner 134 within the outlet portion 112 of the valve body 104 in a manner identical to the liner assembly 102 described above with reference to FIGS. 1 and 2. For example, the first outer surface 154 of the liner 134 is disposed adjacent to and in engagement with the inner surface 244 of the body portion 238 of the sleeve 232. The sleeve engagement surface 160 of the liner 134 axially engages the liner engagement surface 246 of the sleeve 232. This engagement between the liner engagement surface 260 and the sleeve engagement surface 146 limits displacement of the liner 134 relative to the sleeve 232 in a downward direction relative to the orientation of the control valve 100 depicted in FIG. 3. Additionally, as mentioned above, the downstream end portion 134b of the liner 134, which includes the second outer surface 156 of the liner 134, is disposed adjacent to and in engagement with the inner surface 272 of the rim portion 270 of the sleeve 232. In the embodiment disclosed in FIG. 3, the rim portion 270 of the sleeve 232 is disposed radially adjacent the downstream end portion 134b of the liner 134. So configured, when the outlet portion 112 of the control valve 100 depicted in FIG. 3 is coupled to another fluid process control system component such as a tank, for example, the downstream end portion 134b of the liner 134 and the rim portion 270 of the sleeve 232 extend into the tank. Therefore, it should be appreciated that the rim portion 270 of the sleeve 232 protects the downstream end portion 134b of the liner 134 from impact in at least a radial direction during transport and installation of the control valve 100.

Figure 4:
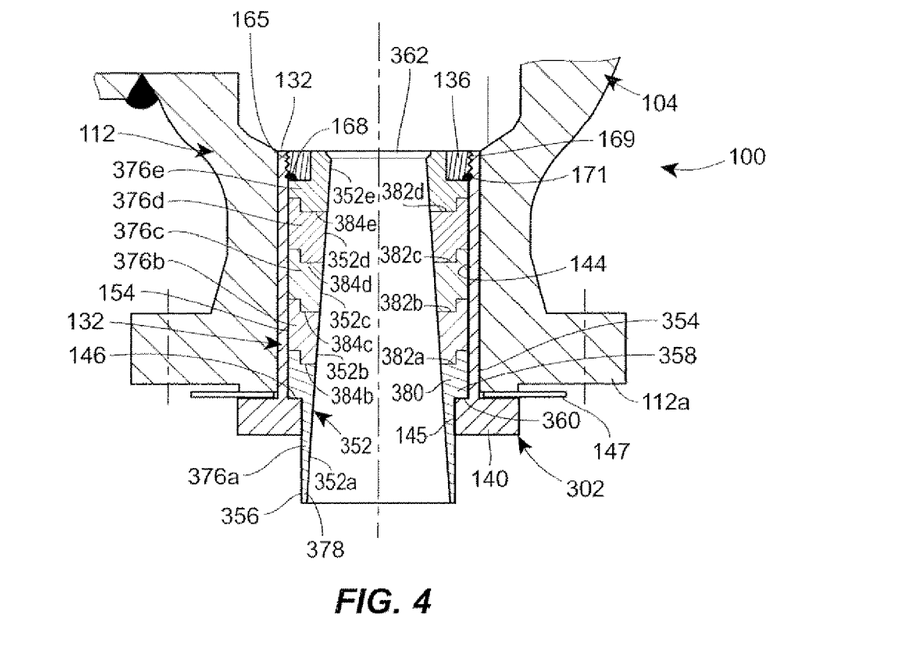
FIG. 4 is a partial cross-sectional side view of the control valve of FIG. 1 comprising another alternative embodiment of a liner assembly and taken from circle II of FIG. 1.

FIG. 4 depicts another alternative sleeve assembly 302 disposed adjacent the outlet portion 112 of the valve body 104 described above with reference to FIG. 1. The sleeve assembly 302 depicted in FIG. 4 is constructed similar to the sleeve assembly 102 described above with reference to FIGS. 1 and 2, and therefore, like components will be identified with like reference numerals. Specifically, the sleeve assembly 302 generally comprises a sleeve 132, a liner 334, and a retainer 136. The sleeve 132 and the retainer 136 of the sleeve assembly 302 depicted in FIG. 4 are identical to the sleeve 132 and retainer 136 described above with reference to FIGS. 1 and 2, and therefore the specific details of each will not be repeated. The liner 334 depicted in FIG. 4, however, differs from the liner 134 described above in that it comprises a plurality of liner components 376.

Specifically, the plurality of liner components 376 are stacked in an axial direction of the liner assembly 302 to define the liner 334 as having a geometry identical to the geometry of the liner 134 described above with reference to FIGS. 1 and 2. Accordingly, a general description of the geometry of the liner 334 will not be repeated.

The plurality of liner components 376, however, include a first liner component 376a, a second liner component 376b, a third liner component 376c, a fourth liner component 376d, and a fifth liner component 376e. The second liner component 376b interlockingly stacks upon the first liner component 376a. The third liner component 376c interlockingly stacks upon the second liner component 376b. The fourth liner component 376d interlockingly stacks upon the third liner component 376c. Finally, the fifth liner component 376e interlockingly stacks upon the fourth liner component 376d.

More specifically, the first liner component 376a includes an elongated hollow body comprising a downstream end portion 378 and an interlocking portion 380. The downstream end portion 378 of the first liner component 376a is very similar to the downstream end portion 134b of the liner 134 described above with reference to FIGS. 1 and 2. For example, the downstream end portion 378 includes a generally cylindrical first outer surface 354, a generally cylindrical second outer surface 356, and a shoulder portion 358. The shoulder portion 358 is disposed between the first and second outer surfaces 354, 356 in the axial direction and defines a sleeve engagement surface 360. The first outer surface 354 includes a diameter that is slightly larger than a diameter of the second outer surface 356. Accordingly, the sleeve engagement surface 360 of the shoulder portion 358 extends radially between and connects the first outer surface 354 and the second outer surface 356. The sleeve engagement surface 360 also axially engages the liner engagement surface 146 of the sleeve 132. The engagement between the sleeve engagement surface 360 and the liner engagement surface 146 limits axial displacement of the liner 334 relative to the sleeve 132 in a downward direction relative to the orientation of the control valve 100 depicted in FIG. 4.

The interlocking portion 380 of the first liner component 376a includes an upper stepped interface 382a. In the disclosed embodiment, the upper stepped interface 382a of the first liner component 376a comprises a pair of axially disposed surfaces connected by a radially disposed surface, thereby resembling a step. In contrast to the first liner component 376a, the second liner component 376b includes an upper stepped interface 382b and a lower stepped interface 384b. The lower stepped interface 384b comprises a pair of axially disposed surfaces connected by a radially disposed surface, thereby resembling a step that is arranged and configured to interlock with the upper stepped surface 387a of the first liner component 376a, as depicted in FIG. 4. Similarly, the third liner component 376c includes an upper stepped interface 382c and a lower stepped interface 384c. The lower stepped interface 384c of the third liner component 376c comprises a pair of axially disposed surfaces connected by a radially disposed surface, thereby resembling a step that is arranged and configured to interlock with the upper stepped surface 382b of the second liner component 376b, as depicted in FIG. 4. Similarly, the fourth liner component 376d includes an upper stepped interface 382d and a lower stepped interface 384d. The lower stepped interface 384d of the fourth liner component 376d comprises a pair of axially disposed surfaces connected by a radially disposed surface, thereby resembling a step that is arranged and configured to interlock with the upper stepped surface 382c of the third liner component 376c, as depicted in FIG. 4. Finally, the fifth liner component 376e includes an upper stepped interface 382e and a lower stepped interface 384e. The lower stepped interface 384e of the fifth liner component 376e comprises a pair of axially disposed surfaces connected by a radially disposed surface, thereby resembling a step that is arranged and configured to interlock with the upper stepped surface 382*d* of the fourth liner component 376*d*, as depicted in FIG. 4.

Additionally, it should be appreciated that because the overall geometry of the liner 334 depicted in FIG. 4 is generally identical to the overall geometry of the liner 134 described above with reference to FIGS. 1 and 2, each of the individual liner components 376*a*-376*e* combine to define an inner surface 352 of the liner 334 generally identical to the inner surface 152 of the liner 134. Accordingly, as depicted in FIG. 4, the first liner component 376*a* includes a generally frustoconical inner surface 352*a* that converges toward the second liner component 376*b*. The second liner component 376*b* includes a generally frustoconical inner surface 352*b* that converges toward the third liner component 376*c*. The third liner component 376*c* includes a generally frustoconical inner surface 352*c* that converges toward the fourth liner component 376*d*. The fourth liner component 376*d* includes a generally frustoconical inner surface 352*d* that converges toward the fifth liner component 376*e*. The fifth liner component 376*c* includes a generally frustoconical inner surface 352*e* that diverges toward the fourth liner component 376*d*. Thus, each of the liner components 376 have varying radial dimensions, thereby defining the generally uniformly frustoconical inner surface 352 of the liner 334.

Further yet, the fifth liner component 376*e* comprises a recess 359 and a valve seat 362. The recess 359 is identical to the recess 159 described above with reference to FIGS. 1 and 2 and receives the retainer 136 to limit axial displacement of the liner 334 relative to the sleeve 132 upward relative to the orientation of the control valve 100 depicted in FIG. 4. The valve seat 362 is also identical to the valve seat 162 described above with reference to the liner 134 depicted in FIG. 2 and is adapted to be sealingly engaged by the valve plug 124 of the control valve 100, as depicted in FIG. 1.

Therefore, it should be appreciated that the configuration of the liner 334 depicted in FIG. 4 provides for a removable liner 334 by simply removing the retainer 136 from the sleeve 132. In the embodiment disclosed, removing the retainer 136 merely includes unthreading the retainer 136 from the sleeve 132. Thereafter, each of the liner components 376 could be removed through the upstream end portion 132*a* of the sleeve 132, one by one, beginning with the fifth liner component 376*e* and finishing with the first liner component 376*a*. The liner assembly 302 disclosed provides for a simple and efficient way to install, remove and/or replace the liner 334 for use with the control valve 100. Additionally, the plurality of liner components 376 that constitute the liner 334 disclosed in FIG. 4 provide for smaller components of a single liner 334, thereby simplifying the assembly process of the liner assembly 302, particularly for relatively large liners.

Figure 5:
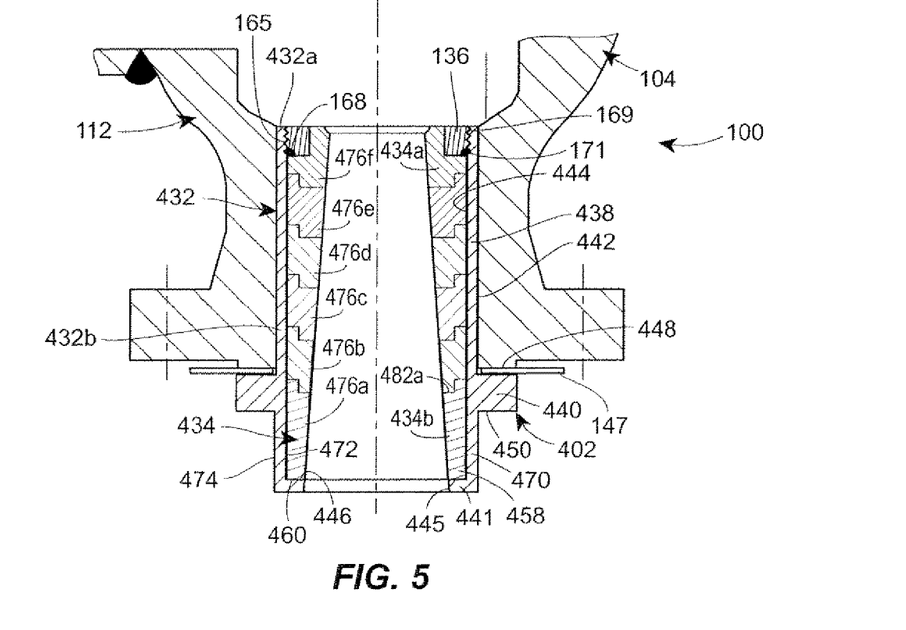
FIG. 5 is a partial cross-sectional side view of the control valve of FIG. 1 comprising yet another alternative embodiment of a liner assembly and taken from circle If of FIG. 1.

FIG. 5 depicts still another alternative sleeve assembly 402 disposed adjacent an outlet portion 119 of a valve body such as the valve body 104 described above with reference to FIG. 1. The sleeve assembly 402 depicted in FIG. 5 is constructed similar to the sleeve assembly 302 described above with reference to FIG. 4, and therefore like components will be identified with like reference numerals, Specifically, the sleeve assembly 402 generally comprises a sleeve 432, a liner 434, and a retainer 136. The retainer 136 of the sleeve assembly 402 depicted in FIG. 5 is identical to the retainer 136 described above with reference to FIGS. 1-4, and therefore its specific details will not be repeated.

Similar to the sleeve 132 described above with reference to FIGS. 1, 2 and 4, the sleeve 432 depicted in FIG. 5 comprises an upstream end portion 432*a*, a downstream end portion 432*b*, a generally cylindrical body portion 438, a flange portion 440, and a shoulder portion 441. Additionally, however, the sleeve 232 includes a rim portion 470 disposed between the flange portion 440 and the shoulder portion 441. The body portion 438 comprises a generally hollow cylinder including an outer surface 442 and an inner surface 444. The outer surface 442 of the body portion 438 of the sleeve 432 engages the inner surface 112*b* of the outlet portion 112 of the valve body 104. In one embodiment, a dimension of the outer surface 444 of the sleeve 432 is slightly smaller than a dimension of the inner surface 112*b* of the outlet portion 112, thereby enabling the sleeve 432 to be slid into and out of the outlet portion 112.

The flange portion 440 of the sleeve 432 is disposed between the body portion 438 and the rim portion 470. The flange portion 440 generally comprises an annular flange extending radially outward of the outer surface 442 of the body portion 438. Accordingly, the flange portion 440 includes an outlet engagement surface 448 and an auxiliary abutment surface 450. In the embodiment depicted, the outlet engagement surface 448 is disposed generally parallel to the auxiliary abutment surface 450 and adjacent the flange 112*a* of the outlet portion 112 of the valve body 104. In the disclosed embodiment, a washer 147 is also disposed between the outlet engagement surface 448 and the flange 112*a*. Additionally, the auxiliary abutment surface 450 is adapted to be engaged by another fluid process control component such as a flange of a length of pipe, an outlet fitting of a tank, or any other such component to thereby removably securing the sleeve 432 in the outlet portion 112 of the valve body 104.

The rim portion 470 of the sleeve 432 is generally cylindrical and extends from the flange portion 440 in a direction opposite of the body portion 438. The rim portion 470 comprises an inner surface 472 and an outer surface 474. The inner surface 472 of the rim portion 470 has a diameter generally identical to a diameter of the inner surface 444 of the body portion 438 of the sleeve 432. In effect, the rim portion 470 of the sleeve 432 depicted in FIG. 5 is a natural extension of the body portion 438 of the sleeve 432 axially beyond the flange portion 440.

The shoulder portion 441 of the sleeve 432 depicted in FIG. 5 is carried by the rim portion 470. The shoulder portion 441 is disposed at an end of the rim portion 470 that is opposite the flange portion 440. The shoulder portion 441 extends radially inward of the inner surface 472 of the rim portion 470 and defines a liner engagement surface 446 and a generally cylindrical opening 445. In the embodiment depicted in FIG. 5, the liner engagement surface 446 is disposed at an angle of approximately 90 degrees relative to the inner surface 472 of the rim portion 470. So configured, the liner engagement surface 446 is engaged by the liner 434 to limit axial displacement of the liner 434 relative to the sleeve 432 in a downward direction relative to the orientation of the control valve 100 depicted in FIG. 5.

More specifically, the liner 434 depicted in FIG. 5 is generally similar to the liner 334 described above with reference to FIG. 4. For example, the liner 434 depicted in FIG. 5 includes an upstream end portion 434*a*, a downstream end portion 434*b*, and a plurality of liner components 476. The liner 434, however, includes six liner components 476*a*-476*f*, whereas the liner 334 depicted in FIG. 4 includes five liner components 376. In this regard, the plurality of liner components 476 of the liner 434 depicted in FIG. 5 comprises a first liner component 476*a*, a second liner component 476*b*, a third liner component 476*c*, a fourth liner component 476*d*, a fifth liner component 476*e*, and a sixth liner component 476*f*. The third through sixth liner components 476*c*-476*f* are identical to the second through fifth liner components 376*b*-376*e* of the liner 334 described above with reference to FIG. 4, and therefore the details of the third through sixth liner components 476c-476f will not be repeated.

In the embodiment of the liner 434 depicted in FIG. 5, the first and second liner components 476a, 476b, respectively, replace the first liner component 376a of the liner 334 described with reference to FIG. 4. For example, the liner 434 depicted in FIG. 5 generally includes an inner surface 452 and an outer surface 454. While the inner surface 452 is identical to inner surface 452 of the liner 334, the outer surface 452 includes a single cylindrical surface of uniform diameter, whereas the liner 334 described above with reference to FIG. 4 includes the first outer surface 354 and the second outer surface 356 having different diameters and separated by the shoulder portion 358.

Accordingly, the first liner component 476a of the liner 434 includes a generally cylindrical body defining a shoulder 458 and an upper stepped inter face 482a. The shoulder 458 comprises a sleeve engagement surface 460 in axial engagement with the liner engagement surface 446 of the shoulder portion 441 of the sleeve 432. The engagement between the sleeve engagement surface 460 and the liner engagement surface 446 limits axial displacement of the liner 434 relative to the sleeve 432 in a downward direction relative to the orientation of the control valve 100 depicted in FIG. 5.

As mentioned, the first liner component 476a includes an upper stepped interface 482a. The upper stepped interface 482a comprises a pair of axially disposed surfaces connected by a radially disposed surface, thereby resembling a step. The second liner component 476b also includes an upper stepped interface 482b, as well as a lower stepped interface 484b. The lower stepped interface 484b of the second liner component 476b comprises a pair of axially disposed surfaces connected by a radially disposed surface, thereby resembling a step that is arranged and configured to interlock with the upper stepped surface 482a of the first liner component 476a, as depicted in FIG. 5. Additionally, the remaining liner components 476 of the liner 434 depicted in FIG. 5 interlock in a manner identical to the liner components 376 of the liner 334 depicted in FIG. 4, and therefore the details thereof will not be repeated.

Similar to the embodiment disclosed in FIG. 3, the rim portion 470 of the sleeve 432 depicted in FIG. 5 is disposed radially adjacent the downstream end portion 434b of the liner 434. So configured, when the outlet portion 112 of the control valve 100 depicted in FIG. 5 is coupled to another fluid process control system component such as a tank, for example, the downstream end portion 434b of the liner 434 and the rim portion 470 of the sleeve 432 extend into the tank. Additionally, the shoulder portion 441 is disposed in the tank. Therefore, it should be appreciated that the rim portion 470 of the sleeve 432 protects the downstream end portion 434b of the liner 434 from impact in at least a radial direction during transport and/or installation of the control valve 100. Additionally, the shoulder portion 441 protects the downstream end portion 434b of the liner 434 from impact in at least an axial direction during transport and/or installation of the control valve 100.

Accordingly, in light of the foregoing, it should be appreciated that the sleeve assemblies 102, 202, 302, 402 disclosed herein provide "drop-in" liners 134, 334, 434 that are slidably disposed within sleeves 132, 232, 432 to enable efficient installation and/or replacement of the liner 134, 334, 434 if and when they become eroded and/or corroded, or otherwise damaged. For example, after decoupling the control valve 100 from another fluid process control system component such as a tank, the respective liner assembly 102, 202, 302, 402 may be slidably removed from the outlet portion 112 of the valve body 104. Thereafter, the retainer 136 may be threadably disengaged from the upstream end portion 132a, 232a, 432a of the sleeve 132, 232, 432. Once the retainer 136 is removed, the liner 134, 334, 434 may be slidably removed through the upstream end portion 1132a, 232a, 432a of the sleeve 132, 232, 432. With respect to the embodiments depicted in FIGS. 1-3, removing the liner 134 merely requires grasping the upstream end portion 114a and sliding the liner 134 out of from the sleeve 132, 232. With respect to the embodiments depicted in FIGS. 4 and 5, however, removing the liner 334, 434 comprises sliding each of the liner components 376, 476 out of the sleeve 132, 232 one at a time. Thus, it should be appreciated that multiple steps are also necessary to assemble and/or install the liner 334, 434 depicted in FIGS. 4 and 5. For example, with reference to FIG. 4, the first liner component 376a can be inserted into the sleeve 132 first such that the shoulder portion 358 of the first liner component 376a abuttingly engages the shoulder portion 141 of the sleeve 132. Next, the second liner component 376b can be inserted into the sleeve 132 such that its lower stepped interface 384b interlockingly engages the upper stepped interface 382a of the first liner component 376a. Upon each of the remaining liner components 376c-3776e being successfully inserted into the sleeve 132, the retainer 136 can then be secured to the upstream end portion 132a of the sleeve 132 to secure the liner 334 in position. It should be appreciated that a generally identical assembly process would be undertaken to assembly and/or install the liner 434 into the sleeve 432 of the sleeve assembly 402 depicted in FIG. 5.

In preferred embodiments of the above-described sleeve assemblies 102, 202, 302, 402, the sleeves 132, 232, 432 are constructed of titanium. However, in alternative embodiments, the sleeves 132, 232, 432 nay be constructed of generally any material capable of serving the principles of the present disclosure. Additionally, in preferred embodiments of the sleeve assemblies 102, 202, 302, 402, the liners 134, 334, 434 are constructed of a ceramic material such as, for example, silicon carbide, or any other ceramic material. In alternative embodiments, however, the liners 134, 334, 434 may be constructed of generally any material capable of serving the principles of the present disclosure such as tungsten carbide or any other material possessing properties capable of withstanding the effects of erosion and/or corrosion of the process.

Additionally, it should be appreciated that while the liner engagement surfaces 146, 246, 446 and sleeve engagement surfaces 160, 360, 460 have been depicted and disclosed herein as being substantially perpendicular to the inner surfaces 144, 244, 444 of the body portion 138, 338, 438 of the sleeves 132, 223, 432; in alternative embodiments the liner engagement surfaces 146, 246, 446 and sleeve engagement surfaces 160, 360, 460 may extend at generally any angle relative to the inner surfaces 144, 244, 444 of the body portion 138, 338, 438 of the sleeves 132, 223, 432. In yet further alternative embodiments, the liner engagement surfaces 146, 246, 446 may not extend at an angle from the inner surfaces 144, 244, 444 at all, but rather the entire inner surfaces 144, 244, 444 may be tapered or other wise configured to limit axial displacement of the liner 134, 234, 434 in the downward direction relative thereto. One skilled in the art should also appreciate that alternate embodiments of the multiple liner component arrangement may interface on substantially planar surfaces without necessarily incorporating the interlocking segments.

What is claimed:

1. A liner assembly adapted to line a valve body of a control valve, the assembly comprising:

a sleeve having an inner surface defining a bore and adapted to be disposed within a portion of the valve body, the sleeve including an upstream end portion and a downstream end portion;

a liner slidably and removably disposed within the bore of the sleeve, the liner having a valve seat portion adjacent an upstream end portion of the liner and a nozzle portion downstream of the valve seat portion, wherein the nozzle portion diverges from the upstream end portion of the liner toward a downstream end portion of the liner, and wherein the upstream end portion of the liner extends to the upstream end portion of the sleeve and the downstream end portion of the liner extends beyond the downstream end portion of the sleeve such that the downstream end portion of the liner is disposed outside of the sleeve, and wherein the sleeve further comprises an engagement surface extending inward of the inner surface of the sleeve in a radial direction of the sleeve, the engagement surface in engagement with the liner; and a retention ring removably secured to the sleeve and in engagement with an axial end portion of the liner, wherein the retention ring comprises a threaded portion in threaded engagement with an axial end portion of the sleeve, wherein when the retention ring is removed from the sleeve, the liner can be slidably removed from the sleeve.

2. The assembly of claim 1, wherein the engagement surface of the sleeve comprises a first shoulder and the liner comprises a second shoulder, the second shoulder in engagement with the first shoulder in an axial direction of the sleeve.

3. The assembly of claim 2, wherein the first shoulder is disposed between the upstream and downstream end portions of the sleeve and the second shoulder is disposed between the upstream and downstream end portions of the liner.

4. The assembly of claim 1, wherein the liner comprises a ceramic liner.

5. The assembly of claim 1, wherein the liner comprises a plurality of liner components.

6. The assembly of claim 5, wherein the plurality of liner components are stacked in an axial direction of the sleeve.

7. The assembly of claim 1, wherein the nozzle portion is generally frustoconical.

8. A liner assembly adapted to line an outlet of a control valve, the assembly comprising:

an elongated sleeve adapted be coupled to the outlet of the control valve, the sleeve comprising:
an upstream end portion and a downstream end portion;
an inner surface, and
a first engagement surface extending radially inward from the inner surface of the sleeve;

an elongated liner slidably and removably disposed the sleeve, the liner comprising:
an outer surface,
a second engagement surface extending radially inward of the outer surface of the liner, the second engagement surface in engagement with the first engagement surface of the sleeve,
a valve seat portion adjacent an upstream end portion of the liner, and
a nozzle portion downstream of the valve seat portion, the nozzle portion diverging from the upstream end portion of the liner toward a downstream end portion of the liner, and wherein the upstream end portion of the liner extends to the upstream end portion of the sleeve and the downstream end portion of the liner extends beyond the downstream end portion of the sleeve such that the downstream end portion of the liner is disposed outside of the sleeve; and a threaded retention ring removably secured to the sleeve and in engagement with the liner to maintain the first engagement surface in engagement with the second engagement surface.

9. The assembly of claim 8, wherein the retention ring is threadably coupled to the upstream end portion of the sleeve and the upstream end portion of the liner.

10. The assembly of claim 8, wherein the sleeve comprises a first shoulder and the liner comprises a second shoulder, the first shoulder comprises the first engagement surface and the second shoulder comprises the second engagement surface.

11. The assembly of claim 10, wherein the first shoulder is disposed between the upstream and downstream end portions of the sleeve and the second shoulder is disposed between the upstream and downstream end portions of the liner.

12. The assembly of claim 8, wherein the liner comprises a ceramic liner.

13. The assembly of claim 8, wherein the liner comprises a plurality of liner components.

14. The assembly of claim 13, wherein the plurality of liner components are stacked in an axial direction of the sleeve.

15. The assembly of claim 8, the nozzle portion is generally frustoconical.

16. A control valve assembly, comprising:

a valve body comprising an inlet, an outlet downstream of the inlet, and a flow path disposed between the inlet and the outlet;

a control clement disposed within the valve body and adapted to control the flow of a fluid through the flow path;

a sleeve comprising an inner surface and an outer surface, the outer surface in engagement with the outlet of the valve body, the sleeve including an upstream end portion and a downstream end portion;

a liner removably disposed within the sleeve, the liner having a valve scat portion adjacent an upstream end portion of the liner and a nozzle portion downstream of the valve seat portion, wherein the nozzle portion diverges from the upstream end portion of the liner toward a downstream end portion of the liner, and wherein the upstream end portion of the liner extends to the upstream end portion of the sleeve and the downstream end portion of the liner extends beyond the downstream end portion of the sleeve such that the downstream end portion of the liner is disposed outside of the sleeve, and wherein the sleeve further comprises an engagement surface extending inward of the inner surface of the sleeve in a radial direction of the sleeve, the engagement surface in engagement with the liner; and a retention ring in engagement with an axial end portion of the liner, the retention ring comprising a threaded portion in threaded engagement with an axial end portion of the sleeve to removably secure the liner within the sleeve.

17. The assembly of claim 16, wherein the engagement surface of the sleeve comprises a first shoulder and the liner comprises a second shoulder, the second shoulder in engagement with the first shoulder in an axial direction of the sleeve.

18. The assembly of claim 17, wherein the first shoulder is disposed between the upstream and downstream end portions of the sleeve and the second shoulder is disposed between the upstream and downstream end portions of the liner.

19. The assembly of claim 16, wherein the liner comprises a ceramic liner.

20. The assembly of claim 16, wherein the liner comprises a plurality of liner components.

21. The assembly of claim 20, wherein the plurality of liner components are stacked in an axial direction of the sleeve.

22. The assembly of claim 16, wherein the nozzle portion is generally frustoconical.

23. A control valve assembly, comprising:
a valve body comprising an inlet, an outlet, and a flow path disposed between the inlet and the outlet;
a control element disposed in the valve body and adapted to control the flow of a fluid through the flow path;
an elongated sleeve coupled to the outlet of the control valve, the sleeve comprising a generally cylindrical inner surface and a first engagement surface, the sleeve also including an upstream end portion and a downstream end portion;
an elongated liner removably disposed in the sleeve, the liner comprising a generally cylindrical outer surface and a second engagement surface in engagement with the first engagement surface of the sleeve in an axial direction of the sleeve, the liner having a valve seat portion adjacent an upstream end portion of the liner and a nozzle portion downstream of the valve seat portion, wherein the nozzle portion diverges from the upstream end portion of the liner toward a downstream end portion of the liner, and wherein the upstream end portion of the liner extends to the upstream end portion of the sleeve and the downstream end portion of the liner extends beyond the downstream end portion of the sleeve such that the downstream end portion of the liner is disposed outside of the sleeve; and
a retention ring in threaded engagement with the sleeve and in abutting engagement with the liner to removably secure the liner within the sleeve.

24. The assembly of claim 23, wherein the first engagement surface of the sleeve extends radially inward of the inner surface of the sleeve and the second engagement surface of the liner extends radially inward of the outer surface of the liner.

25. The assembly of claim 23, wherein the sleeve comprises a first shoulder and the liner comprises a second shoulder, the second shoulder in engagement with the first shoulder in an axial direction of the sleeve.

26. The assembly of claim 25, wherein the first shoulder is disposed between the upstream and downstream end portions of the sleeve and the second shoulder is disposed between the upstream and downstream end portions of the liner.

27. The assembly of claim 23, wherein the liner comprises a ceramic liner.

28. The assembly of claim 23, wherein the liner comprises a plurality of liner components.

29. The assembly of claim 28, wherein the plurality of liner components are stacked in an axial direction of the sleeve.

30. The assembly of claim 23, wherein the nozzle portion is generally frustoconical.

31. A method of removably installing a device for protecting an outlet portion of a valve body of a control valve, the method comprising:
inserting ceramic liner into a sleeve having an upstream end portion and a downstream end portion such that a first engagement surface carried by the sleeve is engaged by a second engagement surface carried by the liner; the first engagement surface extending inward of the inner surface of the sleeve in a radial direction of the sleeve;
removably securing a threaded retention ring to a threaded portion of the sleeve and in engagement with the liner to removably secure the liner within the sleeve; and
inserting sleeve containing the liner into the outlet portion of the valve body such that a valve seat portion of the liner is positioned upstream from a nozzle portion of the liner, wherein the nozzle portion diverges from an upstream end portion of the liner toward a downstream end portion of the liner, and wherein the upstream end portion of the liner extends to the upstream end portion of the sleeve and the downstream end portion of the liner extends beyond the downstream end portion of the sleeve such that the downstream end portion of the liner is disposed outside of the sleeve.

32. The method of claim 31, wherein inserting a ceramic liner into a sleeve comprises inserting a plurality of ceramic liner components into the sleeve in a stacked manner.

33. A liner assembly adapted to line a valve body of a control valve, the assembly comprising:
a sleeve having an inner surface defining a bore and adapted to be disposed within a portion of the valve body, the sleeve including an upstream end portion and a downstream end portion;
a liner slidably and removably disposed within the bore of the sleeve, the liner having a valve seat portion adjacent an upstream end portion of the liner and a nozzle portion downstream of the valve seat portion, wherein the nozzle portion diverges from the upstream end portion of the liner toward a downstream end portion of the liner, and wherein the upstream end portion of the liner extends to the upstream end portion of the sleeve and the downstream end portion of the liner extends beyond the downstream end portion of the sleeve such that the downstream end portion of the liner is disposed outside of the sleeve, and wherein the sleeve comprises a first shoulder and the liner comprises a second shoulder, the second shoulder in engagement with the first shoulder in an axial direction of the sleeve; and
a retention ring removably secured to the sleeve and in engagement with an axial end portion of the liner, wherein the retention ring comprises a threaded portion in threaded engagement with an axial end portion of the sleeve,
wherein when the retention ring is removed from the sleeve, the liner can be slidably removed from the sleeve.

34. A control valve assembly, comprising:
a valve body comprising an inlet, an outlet downstream of the inlet, and a flow path disposed between the inlet and the outlet;
a control element disposed Within the valve body and adapted to control the flow of a fluid through the flow path;
a sleeve comprising an inner surface and an outer surface, the outer surface in engagement with the outlet of the valve body, the sleeve including an upstream end portion and a downstream end portion;
a liner removably disposed within the sleeve, the liner having a valve seat portion adjacent an upstream end portion of the liner and a nozzle portion downstream of the valve seat portion, wherein the nozzle portion diverges from the upstream end portion of the liner toward a downstream end portion of the liner, and wherein the upstream end portion of the liner extends to the upstream end portion of the sleeve and the downstream end portion of the liner extends beyond the downstream end portion of the sleeve such that the downstream end portion of the liner is disposed outside of the sleeve, and wherein the sleeve comprises a first shoulder and the liner comprises a second shoulder, the second shoulder in engagement with the first shoulder in an axial direction of the sleeve; and
a retention ring in engagement with an axial end portion of the liner, the retention ring comprising a threaded portion in threaded engagement with an axial end portion of the sleeve to removably secure the liner within the sleeve.

* * * * *